3,121,115
AMINOALKYLATION OF AMINES AND PHENOLS
Walter C. Meuly, New Brunswick, N.J., assignor to E. I. du Pont de Nemours and Company, Wilmington, Del., a corporation of Delaware
No Drawing. Filed May 2, 1960, Ser. No. 25,836
7 Claims. (Cl. 260—570.5)

This invention relates to the catalytic aminoalkylation of amines and phenols and more particularly to a process of aminoalkylating alkylatable amines or phenols with aminoalkanols in the presence of catalytic quantities of an acidic condensing agent.

Aminoalkylation of an alkylatable substance such as an amine having a replaceable hydrogen may be accomplished in a variety of ways, notably, by heating the amine with an aminoalkanol in the presence of an acid-reacting condensing agent, the quantity of condensing agent being at least the molar equivalent of the aminoalkanol. Thus N-phenyl piperazine has been produced by heating aniline hydrochloride with diethanolamine hydrochloride and N-(2-diethylaminoethyl) aniline has been prepared by heating approximately equivalent proportions of aniline, 2-diethylaminoethanol and phosphoric pentoxide. In each case, the aminoalkylated product is obtained as a salt of an acid. The acid component of the salt is the acidic condensing agent itself or is an acid derived therefrom during the course of the reaction or during the work-up of the reaction mass. To obtain the amine as the free base, which normally is the desired form for purification or further use, it is necessary to neutralize the acid component of the reaction mass by the addition of alkali. This general process has the disadvantages of employing relatively large proportions of the acid condensing agent and of requiring the additional step of neutralizing the reaction mass to obtain the free base.

The aminoalkylations have also been effected by heating the amine to be alkylated with an ester of the aminoalkanol, for example, phosphate, sulfate, sulfonate, halide. Such use also has the disadvantage of producing a full equivalent of an acid (the hydrogen acid corresponding to the ester group of the active ester, e.g. hydrogen halide, hydrocarbon sulfonic acid, etc.) which must be neutralized if the product is to be obtained as the free base. Further, it has the obvious drawback of added cost, as the active esters are most economically obtained from the aminoalkanols themselves.

It is an object of this invention to provide a novel aminoalkylation process, applicable to amines or phenols, which process involves the use of an aminoalkanol alkylating agent and produces a reaction mass containing substantial proportions of the aminoalkylated product in the form of the free base. A further object is to provide an aminoalkylation process which involves the use of catalytic quantities of an acidic condensing agent and which may be carried out in a cyclic manner, requiring only the further addition of the substance to be aminoalkylated and the aminoalkanol alkylating agent. Other objects will appear hereinafter.

These and other objects of this invention are accomplished by the process of aminoalkylating an alkylatable amine or phenol which comprises heating the alkylatable material with an alkanolamine in the presence of a catalytic amount of an acid condensing agent to a temperature of from about 150 to 250° C., removing the water of reaction and recovering the aminoalkylated product. As noted above, the aminoalkylation of an alkylatable substance with an aminoalkanol in the presence of an acid condensing agent is well known. The present invention is based on the significant discovery that only a catalytic amount of the acid condensing agent, from about 0.001 to 0.5 mol, based on phosphoric acid, per mol of alkylatable material, is required to effect condensation of the alkylatable material with the aminoalkanol alkylating agent whereby the aminoalkylated product is obtained as the free base in good yield.

The acid condensing agent which is used in the process of the present invention as the catalyst is a phosphoric acid compound. Suitable phosphoric acid catalysts which may be employed include aqueous phosphoric acid such as the syrupy orthophosphoric acids, anhydrous orthophosphoric acid, pyrophosphoric acid, phosphorus pentoxide or the alkyl phosphoric acids. Ordinary syrupy (i.e. 85% by weight) orthophosphoric acid is conveniently employed and is preferred because of its relatively low cost. The alkyl phosphoric acids may be obtained by reacting alkanols, such as 2-diethylaminoethanol, with pyrophosphoric acid or phosphorus pentoxide. The phosphoric acid catalyst may be added to the reaction mass as such or, in the case of the alkyl phosphoric acids, it may be produced in situ in the presence of the reactants and under the conditions of the reaction.

The quantity of catalyst may be varied widely but will be substantially less on a molecular basis than that of either reactant, so as to produce a reaction mass containing a practical quantity of the free base form of the aminoalkylated product. Normally the quantity of catalyst will correspond to less than about 0.5 mol per molecule of the aminoalkylatable substance, may be as low as 0.001 mol, but usually will be at least 0.01 mol and not more than about 0.25 mol. The quantity of catalyst should be calculated as moles of phosphoric acid. Thus, the above recited amounts apply when phosphoric acid is used. However, when using phosphorus pentoxide which is equivalent to two moles of phosphoric acid, the amount of catalyst will correspond to 0.0005 to 0.25 mol per mol of alkylatable material.

The aminoalkylation process for amines and phenols may be illustrated schematically by the following equations:

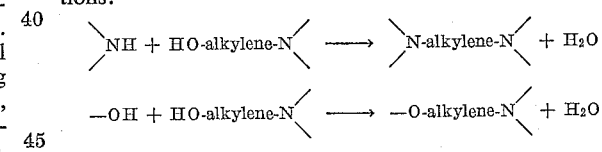

In each instance water of reaction is formed. In general, the reaction consists in holding an aminoalkylatable substance with an aminoalkylating agent in the presence of a phosphoric acid catalyst at a temperature at which water of reaction is formed at a practical rate. The water is then removed and the free base aminoalkylated product recovered. In a prefered embodiment, the catalyst and the conditions are chosen so as to produce a readily separable two-phase reaction mass consisting essentially of the free base aminoalkylated product in one phase and the catalyst in the other.

The reactants and the catalyst may be added to the system in any order, either separately or admixed with one another. Solvents may be employed if desired. The reaction mass temperature required to effect formation and practical removal of water from the reactants will usually be in the range 150–250° C., with at least about 180° C. preferred and not higher than about 225° C. generally needed. The water of reaction is preferably removed as it is formed, as by distillation. Water removal techniques may involve azeotropic distillation; blowing an inert gas such as nitrogen, methane, carbon dioxide or air, through the reaction mass; use of a dephlegmator to permit distillation of the water while minimizing distillation of the reactants.

The pressure on the system will ordinarily be atmospheric but may be super- or sub-atmospheric. It is generally desirable to limit open vessel (atmospheric) operation to reactants boiling above about 140–150° C., and to use correspondingly higher pressures for lower boiling reactants. The water of reaction may be released from the pressurized reactor in any of the usual ways known in the art wherein a volatile reaction product is continually or semi-continuously removed from a pressurized reaction vessel. With suitably high-boiling reactants it is sometimes beneficial to apply a vacuum to facilitate removal of the water of condensation. An inert atmosphere may replace air over reactants and products prone to oxidize. Inert gas bubbled through the reaction mass entrains water as well as provides the inert atmosphere.

Solvents may be used in particular condensations to provide a homogeneous reaction mass or a more easily stirrable one, or more readily controllable temperatures, smoother removal of water by azeotropy and smoothness of reaction in general. Inert solvents that may be used are the high-boiling hydrocarbons particularly the aromatics such as decalin, and such substituted hydrocarbons as trichlorobenzene, diphenylether, and nitrobenzene. Where feasible, excess of a reactant may be used; ordinarily however, the aminoalkanol in excess is preferred. Also the reaction product itself may be used as the medium for the next condensation.

Agitation, as by stirring, may be employed to effect intimate contact of the reactants with the catalyst. Normally however, the hot reaction mass at the temperatures of the process will be sufficiently homogeneous so as to make mechanical agitation unnecessary.

The time of condensation is usually 2 to 50 hours, sometimes more or less depending on the reactants, quantities involved and the temperature. Heating is stopped when water no longer forms. The reaction mass may be distilled directly to recover the aminoalkylated substance as the free base.

Preferably, with the heating step completed and the water of reaction removed, the reaction mass is cooled whereupon it normally separates into two phases. The upper reaction product phase is simply decanted from the lower catalyst phase and worked up without using alkali to yield the free base form of the aminoakkylated product. The catalyst phase, which comprises the acid content of the system in the form of amine salt, may be used directly to effect condensation of additional appropriate quantities of the reactants.

Normally there will be employed at least about one molecule of aminoalkylating agent for each aminohydrogen, or phenolic hydrogen, to be replaced, and preferably about a 10 to 30% excess over such stoichiometric amounts. Such excess will be generally desirable because normally some of the aminoalkanol leaves the reaction zone, for example, as an azeotrope with the water of reaction that is being removed, and also because some of the aminoalkanol self-condenses, yielding as much as 20% of the corresponding ether.

The process of this invention may be used to prepare a wide variety of products having at least one aminoalkyl group. These products may be represented by the formula R(X-alkylene-B)$_n$ wherein R is an organic radical having a valence equal to the value of $n$; X is phenolic oxygen, —NH—, or —NR'—, with R' being a monovalent organic radical; alkylene is a 1,2-, 1,3- or 1,4- divalent member of the class; and B is a secondary amino radical wherein the amino nitrogen has the character of an aliphatic or cycloaliphatic amino nitrogen, i.e. the nitrogen is a basic non-aromatic amino nitrogen. In other words, in the radical -alkylene-B, the amino nitrogen has the character of a basic tertiary amino nitrogen.

In preparing these products any of the amines or phenols which have been aminoalkylated by the known prior art procedures may be employed. Thus, any alkylatable amine or phenol having at least one replaceable amino- or phenolic hydrogen, R(XH)$_n$, may be reacted with an aminoalkanol alkylating agent, HO-alkylene-B, wherein R, X, $n$, alkylene and B are as defined above.

In the aminoalkylating agent, HO-alkylene-B, alkylene is a 1,2-, 1,3- or 1,4- divalent member of the class, e.g. ethylene, 1,2-propylene, 1,3-propylene, 1,4-butylene (tetramethylene), 1,2-dimethylethylene, 2-methyl-1,3-propylene, and the like, and B is a secondary amino radical having the character of a basic aliphatic or cycloaliphatic secondary amino radical, e.g. dimethylamino, diethylamino, dibutylamino, pyrrolidino and the like. HO-alkylene-B may also be regarded as a tertiary amine wherein the nitrogen has the basicity, i.e. the character of an aliphatic or cycloaliphatic hydrocarbon amine, and wherein at least one of the three organic groups on the tertiary amino nitrogen is an hydroxyalkyl radical.

Examples of suitable N-tertiary aminoalkanols that may be employed in the process are: 2-diethylaminoethanol, 2-(N-ethyl laurylamino)ethanol, 2-dimethylaminoethanol, 2-piperidinoethanol, 2-pyrrolidinoethanol, 2-(2,4-dimethylpyrrolidino)ethanol, 2-dimethylaminopropanol, 2-dimethylaminoisopropanol, 3-dimethylaminobutanol, 2-di-n-propylaminoethanol, 2-di-n-butylaminoethanol, 2-(2-methylpyrrolidino)isopropanol, 3-(N-methylstearylamino)propanol, 4-dimethylaminobutanol, 2-(2,6-dimethylpiperidino)ethanol, 2-(N-ethylpiperazino)ethanol, 2-morpholinoethanol, 2-thiamorpholinoethanol, N-ethyl-diethanolamine, triethanolamine, tetrakis(2-hydroxypropyl)ethylenediamine, 1,4-bis-hydroxyethyl-piperazine, 2-(di-2-ethoxyethylamino)ethanol, 2 - (N-methylcyclohexylamino)ethanol and 2-(N-ethylphenylethylamino)ethanol. It should be noted that in the above illustrative aminoalkanol alkylating agents the secondary amino radical (corresponding to B of the formula) has the character of an aliphatic or cycloaliphatic hydrocarbon amino radical and may consist simply of hydrocarbon radicals joined to the amino nitrogen through saturated carbon atoms, including such radicals wherein the two carbons attached to the nitrogen are part of the same divalent hydrocarbon radical which together with the nitrogen constitutes a cyclic secondary amino radical. Also as illustrated, it is not necessary that the radicals attached to the amino nitrogen, other than the alkylene radical, be completely hydrocarbon. They may be substituted radicals, such as oxa, thia, and aza analogs of hydrocarbon radicals, so long as the nitrogen has the character of a basic aliphatic or cycloaliphatic amino nitrogen. Also as shown, the aminoalkanol may contain more than one basic amino nitrogen and more than one hydroxyalkyl group.

Alkylatable amines to which this invention applies are those having at least one amino hydrogen that is replaceable by the group, -alkylene-B, defined above. Included broadly are primary and secondary aliphatic, cycloaliphatic and aromatic amines. The non-aromatic hydrocarbon primary and secondary amines constitute an important class of alkylatable amines, as their aminoalkylated derivatives are widely useful. For example, aminoalkylated products useful as surfactants are obtained by aminoalkylating amines such as listed below with 2-diethylaminoethanol or the like: N-methyl octaylamine, N-hexyl octylamine, N-methyl tridecylamine, N-methyl cetylamine, N-ethyl cyclohexylamine, N-(methoxyethyl) octylamine, N-ethyl dodecylamine, N-(ethoxyethyl)octylamine, N-(hydroxyethyl)laurylamine, decahydroquinoline, N-methyl cyclohexylamine, N-methyl heptadecylamine, hexylamine, dodecylamine, decahydronaphthylamine, stearylamine, oleylamine, dehydroabietylamine, and 2-methylpiperidine.

Many of the aminoalkylated products are specifically known as textile-treating agents; for example, N,N-diethyl-N'-hydroxyethyl-N'-lauryl ethylene diamine, N-(2-diethylaminoethyl)decahydronaphthylamine, and N-stearyl-N',N'-diethyl ethylene diamine. Also virucidal activity has been disclosed for N,N,N'-trimethyl-N'-heptadecyl ethylene diamine.

The aromatic primary and secondary amines comprise another important class of alkylatable amines, useful for the preparation of dyes, photographic chemicals, and pharmacologically active substances. These alkylatable amines may be mono- or polynuclear aromatic or mixed aliphatic-aromatic, unsubstituted or substituted. Prototypes are aniline, naphthylamine, aminobiphenyl, aminosubstituted diphenylmethane and triphenylmethane, aminoquinoline and phenothiazine, which ring systems may contain nuclear substituents such as alkyl, alkoxyl, halo and nitro groups and N-substituents such as alkyl, alkoxyalkyl, hydroxyalkyl, dialkylaminoalkyl and the like. Examples are: aniline, o-, m-, and p-toluidine, o-, m-, and p-anisidine, 2-methoxy-5-methylaniline, 2,5-dimethoxyaniline, o-, m-, and p-chloroaniline, 2,5-dichloroaniline, o-nitroaniline, N-methylaniline, N-ethyl-m-toluidine, N-butyl-p-ethylaniline, N-hydroxyethylaniline, N-cyclohexylaniline, naphthylamine, N-ethyl-alpha-napthylamine, N-phenyl-alpha-naphthylamine, ditolylamine, dianisylamine, indoline, hexahydrocarbazole, diphenylamine, 3-chlorodiphenylamine, o-aminoquinoline, 6-methoxy-8-aminoquinoline, p-aminodiphenylmethane, p,p'-diaminodiphenylmethane p,p',p''-triaminotriphenylmethane, phenothiazine, 2-chlorophenothiazine, dihydroacridine, m-phenylidenediamine, p-phenylenediamine and benzylamine.

Representative aminoalkylated derivatives of the above class are those in which an amino hydrogen is replaced by a substituted aminoethyl- or propyl group. For example, such derivatives include N-ethyl-N-(2-diethylaminoethyl) - m - toluidine, N-(2-diethylaminoethyl)-o-chloroaniline, N-(2-diethylaminoethyl)-o-nitroaniline, N-(2-diethylaminoethyl)-2,5-dimethoxyaniline, N-phenyl-N-(2-diethylaminoethyl)-aniline, N-ethyl-N-(2-dibutylaminoethyl)-m-toluidine, N-ethyl-N-(3-dimethylaminopropyl) - m-toluidine, N-ethyl-N-(2-diethylaminoethyl)alpha-naphthylamine, N-[2-bis(hydroxyethyl)aminoethyl]phenothiazine and N-(2-pyrrolidinoethyl)phenothiazine.

More than one amino hydrogen may be replaced in any of the above alkylatable amines having more than one replaceable hydrogen. Thus, reaction of aniline with N-methyldiethanolamine yields N-phenyl-N'-methylpiperazine as well as N-methyl[2-(hydroxyethyl)aminoethyl] aniline. Also m-tolylenediamine reacts with two molecules of diethylaminoethanol to form N,N'-bis-(2-diethylaminoethyl)-m-tolylenediamine. Similarly, with p-phenylenediamine, depending on the ratios of the reactants, there is formed N-(2-diethylaminoethyl)-p-phenylenediamine as well as the N,N'-bis- derivative. The p-phenylenediamine derivatives are useful as photographic developers. The other amino-alkylated products may be used as dye intermediates; for example, N-(2-diethylaminoethyl)-o-chloroaniline and the like may be used for the preparation of azo and triphenylmethane dyes. Antihistamines and tranquilizing agents are found among the diarylamine and phenothiazine derivatives such as for example N-(2-pyrrolidinoethyl)phenothiazine and N-dimethylaminoisopropyl di-o-tolylamine.

The mono and polyhydric phenols constitute another important class of alkylatable substances. These may be unsubstituted or substituted with alkyl, alkoxy, and halo groups, in analogy to the alkylatable amines. Examples are phenol, the cresols e.g. p-cresol, the xylenols e.g. 2,6-xylenol, p-octylphenol, 2,4-dichlorophenol, 3-methoxyphenol, hydroquinone, resorcinol, p,p'-dihydroxy-biphenyl, di-(o-hydroxyphenyl)methane, and 2,2-di-(p-hydroxyphenyl)propane, each of which contains at least one alkylatable phenolic hydrogen.

One or more hydrogens of a polyhydric phenol may be replaced; for example, hydroquinone and resorcinol yield mono and bis derivatives on reaction with 2-diethylaminoethanol. These products are useful as surfactants in general and may be used as antiicing agents in gasoline. With a polyhydric aminoalkanol such as triethanolamine, the polyhydric phenols form basic high molecular weight products which are useful as anion exchange resins.

The present invention represents a distinct advance in the art in that a relatively minor, catalytic quantity of the phosphoric acid condensing agent is used in the aminoalkylation process and the aminoalkylated product is obtained as the free base in good yield. Heretofore, essentially stoichiometrically equivalent quantities of the acid condensing agent were used and it was necessary to neutralize the resulting product in order to obtain the free base. In accordance with the present process, the aminoalkylated product may be separated from the system by simple decantation or distillation. The residual catalyst is capable, without further treatment, of catalyzing the reaction of additional quantities of the alkanolamine and alkylatable material. Thus, in contrast to the prior art technology, the present invention seeks not to destroy but to preserve the acid content of the system. Preservation and reuse of the acid content of the reaction mass provides a cyclic process which is self-perpetuating with respect to the catalyst and requires only replenishment of the aminoalkanol alkylating agent and the substance to be aminoalkylated.

The following examples will better illustrate the nature of the present invention; however, the invention is not intended to be limited to these examples. Parts are by weight unless otherwise indicated.

Example 1

A mixture consisting of 548 parts (4.0 moles) N-ethyl-m-toluidine, 624 parts (5.33 moles) 2-diethylaminoethanol and 46.1 parts syrupy 85% phosphoric acid (0.4 mole) was heated to 170° C. while slowly bubbling nitrogen below the surface of the charge. Water and 2-diethylaminoethanol, as an azeotrope, slowly distilled as the temperature of the charge was raised over a period of 36 hours to 210° C. The heat input was so regulated as to keep the vapor temperature of the distillate between 90 and 100° C. The total distillate consisted of 81 parts water and 69 parts 2-diethylaminoethanol. The reaction mass was cooled to 23–26° C. and the upper layer weighing 992.5 parts decanted from the lower (amine-phosphoric acid catalyst) layer weighing 68 parts, then distilled up to an inside temperature of 160° C. at 12 mm. of Hg pressure. After first recovering some diethylaminoethylether and unreacted diethylaminoethanol and N-ethyl-m-toluidine, there was obtained 447 parts N-ethyl-N-(2-diethylaminoethyl)-m-toluidine as a light amber liquid having refractive $n_D^{25}$ 1.5180. The yield was 90% based on the quantity of N-ethyl-m-toluidine consumed. The mixed ether, diethylaminoethanol and N-ethyl-m-toluidine can be analyzed and recycled for use in the preparation of another batch of product. Following the procedure above but using the same molar proportion of heptadecyl methylamine in place of N-ethyl-m-toluidine, there is obtained N,N-diethyl-N'-methyl-N'-heptadecyl ethylenediamine boiling over the range of 160–170° C. at 0.5 mm. Hg pressure.

Example 2

The residue from Example 1 (the amine-phosphoric acid catalyst layer) was employed to produce additional quantities of the aminoalkylated product as follows:

270 parts (2.0 moles) of N-ethyl-m-toluidine was added to the 68 parts of catalyst residue of Example 1 and the mixture heated to 200° C. The amount of catalyst as phosphoric acid is about 0.2 mol per mol of amine. Then 295 parts (2.50 moles) of 2-diethylaminoethanol was added gradually over a period of 9 hours while keeping the reaction mass at 203–205° C. and the column head distilling temperature at 90–98° C. The addition of the 2-diethylaminoethanol completed, the reaction mass was heated for another hour at 205° C., then cooled to 23–26° C. The upper layer weighing 476 parts was decanted from the lower catalyst layer weighing 69 parts, then distilled as in Example 1 to give N-ethyl-N-(2-diethylaminoethyl)-m-toluidine, boiling range 108–109° C. at 0.8 mm., in 83% yield based on consumed N-ethyl-m-toluidine.

Again the catalyst residue (amine-phosphoric acid salt) which amounts to about 68 parts could be reused for subsequent reaction runs without impairment of its activity.

*Example 3*

A mixture consisting of 256 parts (2.0 moles) m-chloroaniline, 247 parts (2.2 moles) 2-diethylaminoethanol and 12 parts 85% phosphoric acid (0.1 mole) was heated to 180° C. at which temperature water was evolved. During 8 hours, with a slow stream of nitrogen introduced below the surface of the charge, the temperature was raised to 205° C. at such a rate as to maintain the vapor temperature of the aqueous distillate between 90–100° C. A total 50 parts of distillate was collected; about 14 parts was diethylaminoethanol, the rest water (2.0 moles).

450 parts of the reaction mass was decanted from a lower (phosphoric acid-amine) layer weighing 23 parts, then distilled to yield (after removal of some diethylaminoethanol, m-chloroaniline and diethylaminoethyl ether as low-boiling cuts): 300 parts N-(2-diethylaminoethyl)-m-chloroaniline boiling at 110° C. at 0.1 mm. of Hg pressure and having refractive index $n_D^{25}$ 1.5365; and about 40 parts of N-bis(2-diethylaminoethyl)-m-chloroaniline, boiling range 135–140° C. at 0.1 mm. of Hg, $n_D^{25}$ 1.5230.

The catalyst residue could be reused for subsequent reaction without impairment of its activity.

In the above example, increasing the relative proportion of the aminoalkanol increased the proportion of bis derivative in the products.

*Example 4*

By employing N-ethylaniline in place of N-ethyl-m-toluidine in the procedure of Example 1 there was obtained N-ethyl-N-(2-diethylaminoethyl)aniline, boiling at 146–147.5° C. at 11–12 mm. of Hg and of refractive index $n_D^{25}$ 1.5186. The yield was 53.6% based on the quantity of product recovered and 89% based on N-ethylaniline consumed.

The aminoalkylated products of Examples 1–4 are typically useful as dye intermediates. For example, they may be quaternized by reaction with an alkylating agent such as diethylsulfate, then coupled, for example, with diazotized o-chloro-p-nitroaniline to yield dyes for synthetic acrylic fibers.

*Example 5*

170 parts (1.54 moles) hydroquinone, 200 parts (1.70 moles) 2-diethylaminoethanol and 7 parts 85% phosphoric acid (0.06 mole) were mixed and heated in a slow stream of nitrogen to 185° C. whereby water of reaction began to distill. The temperature was gradually raised over a period of 7 hours to 206° C. to maintain steady distillation of water. When distillation of water ceased a total of 25 parts of water had been collected along with 12 parts of diethylaminoethanol. The reaction mass was found to contain both the monoalkylated product, that is, 125 parts of p-hydroxyphenyl diethylaminoethyl ether, melting range 80–82° C. and 90 parts of the dialkylated product, hydroquinone bis(diethylaminoethyl)ether, boiling range 142–146° C. at 0.1 mm., $n_D^{25}$ 1.4985. These products are separated by solubilizing the monoether in aqueous 10% NaOH.

*Example 6*

114 parts (0.5 mole) of 2,2-di(p-hydroxyphenyl) propane and 50 parts (0.33 mole) of triethanolamine and 2.5 parts 85% phophoric acid (0.02 mole) were heated together in a slow stream of nitrogen at 210–220° C. for 7 hours, yielding 16 parts or 90% of the theoretical quantity of water as distillate. The reaction mass on cooling hardened to a brittle cake which could be heat drawn to a filament. The mass was extracted with dilute aqueous alkali and the insoluble portion made faintly acid to Congo red paper with normal HCl and filtered to yield a free-flowing tan powder containing 3.5% nitrogen and 5.3% chlorine. Contact with aqueous sodium bicaronate results in displacement of chloride ion from the resin.

*Examples 7–11*

The general procedure described in Example 1 above was employed to obtain N-(2-diethylaminoethyl) substituted products from the amines listed below. The starting temperature was about 180° C. in each case and the final temperature generally about 205–215° and in a few instances as high as 230° C. The ratio of moles of phosphoric acid to the starting amine, time of reaction, boiling point and yield of desired product are tubulated below.

| Ex. | Starting Alkylatable Amine | Acid/Amine Ratio | Reaction time, hrs. | Diethylamino ethylated Product | |
|---|---|---|---|---|---|
| | | | | B.P., ° C./ 0.05–0.1 mm. | Percent yield |
| 7 | Aniline | 0.1 | 31 | 70 | [1] 65 |
| 8 | 2,5-dimethoxyaniline | 0.06 | 22 | 125 | 73 |
| 9 | 2,5-dichloroaniline | 0.05 | 22 | 110 | 63 |
| 10 | 2-methoxy-5-methyl-aniline. | 0.1 | 16 | 105 | 67 |
| 11 | alpha-naphthylamine | 0.05 | 14 | 137 | 70 |

[1] There was also obtained the N,N-bis(diethylaminoethylated) aniline in 15% yield, B.P. 110°/0.1 mm. Hg.

*Example 12*

Example 1 was repeated with 209 parts (1.2 mole) 2-dibutylaminoethanol, 135 parts (1.0 mole) N-ethyl-m-toluidine, and 7 parts (0.06 mole) 85% phosphoric acid, the mixture being heated from 180 to 222° C. over 5.5 hours, to yield 14 parts of a reuseable acid catalyst layer and N-ethyl-N-(2-dibutylaminoethyl)-m-toluidine, B.P. 139°/0.1 mm. Hg, in 85% yield.

*Example 13*

Example 1 was repeated with 142 parts (1.1 mole) 3-diethylaminopropan-1-ol and 10 parts 85% phosphoric acid per 135 parts (1.0 mole) of N-ethyl-m-toluidine. After heating the mixture 10 hours from 190 to 230° C., there was obtained a 60% yield of N-ethyl-N-(3-diethylaminopropyl)-m-toluidine, B.P. 102° C. at 0.1 mm. Hg.

*Example 14*

By the procedure of Example 1, a mixture of 122 parts (1.0 mole) m-tolylenediamine, 140 parts (1.2 moles) 2-diethylaminoethanol, and 11 parts (0.09 mole) 85% phosphoric acid was heated over 4 hours from 160 to 193° C., then 131 parts (1.1 mole) 2-diethylaminoethanol again added and the mixture reheated from 184 to 236° C. for 13 hours. After cooling, 326 parts of crude product was decanted from 21 parts of reuseable acid catalyst phase and washed thoroughly with water to yield 310 parts (95%) of the N,N'-bis(diethylaminoethylated) product, identified by analysis.

*Example 15*

By the procedure of Example 1, a mixture of 384 parts (3.0 moles) o-chloroaniline, 150 parts (1.0 mole) triethanolamine, and 8 parts (0.06 mole) 85% phosphoric acid was heated from 185 to 230° C. in 11.5 hours. After cooling, the organic layer was extracted twice with 1200 parts water at 60° C., pumped at 175° C. and 0.2 mm. Hg pressure for several hours, then crystallized from acetone solution to yield white crystals, M.P. 135–137° C., identified as tris-(2-o-chloroanilinoethyl)amine.

As many widely different embodiments of this invention may be made without departing from the spirit and scope thereof, it is to be understood that this invention is not limited to the specific embodiments thereof except as defined in the appended claims.

What is claimed is:
1. In the process of aminoalkylating a compound se- lected from the group consisting of amines having replaceable amino hydrogen and mono-cyclic phenols wherein said compound is heated with an alkanolamine in the presence of an acid condensing agent catalyst, the improvement which comprises heating, to a temperature of from about 150 to 250° C., said compound with said alkanolamine as the sole alkylating agent in the presence of from about 0.001 to 0.5 mol of a phosphoric acid condensing agent catalyst, per mol of said compound, removing the water of reaction and recovering the aminoalkylated product.

2. A process according to claim 1 wherein the catalyst is selected from the group consisting of orthophosphoric acid, pyrophosphoric acid, phosphorus pentoxide and alkyl phophoric acids.

3. A process according to claim 1 wherein the catalyst is aqueous orthophosphoric acid containing 85% by weight of the acid.

4. A process according to claim 3 wherein the amount of catalyst employed is from about 0.01 to 0.25 mol per mol of alkylatable compound and the temperature at which the heating is carried out is from about 180 to 225° C.

5. A process according to claim 4 wherein N-ethyl-N-(2-diethylaminoethyl)toluidine is prepared from N-ethyl-m-toluidine and 2-diethylaminoethanol.

6. A process according to claim 4 wherein N-ethyl-(2-diethylaminoethyl)aniline is prepared from N-ethylaniline and 2-diethylaminoethanol.

7. A process according to claim 4 wherein N-(2-diethylaminoethyl)-o-chloroaniline is prepared from m-chloroaniline and 2-diethylaminoethanol.

References Cited in the file of this patent

UNITED STATES PATENTS

| | | |
|---|---|---|
| 2,017,051 | Arnold et al. | Oct. 15, 1935 |
| 2,017,069 | Lazier | Oct. 15, 1935 |
| 2,073,671 | Andrews | Mar. 16, 1937 |
| 2,766,277 | Gleim | Oct. 9, 1956 |
| 2,999,082 | Holtschmidt et al. | Sept. 5, 1961 |

FOREIGN PATENTS

| | | |
|---|---|---|
| 1,125,640 | France | July 16, 1956 |